(12) United States Patent
Lee et al.

(10) Patent No.: US 9,280,538 B2
(45) Date of Patent: Mar. 8, 2016

(54) SENTENCE HIDING AND DISPLAYING SYSTEM AND METHOD

(71) Applicant: Electronics and Telecommunications Research Institute, Daejeon (KR)

(72) Inventors: Sang Kwang Lee, Daejeon (KR); Ki Young Kim, Daejeon (KR); Jin Kyeong Kim, Daejeon (KR); Jin Tae Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 13 days.

(21) Appl. No.: 14/292,498

(22) Filed: May 30, 2014

(65) Prior Publication Data

US 2015/0302004 A1    Oct. 22, 2015

(30) Foreign Application Priority Data

Apr. 22, 2014 (KR) .......................... 10-2014-0048165

(51) Int. Cl.
```
H04N 1/40      (2006.01)
G06F 17/28     (2006.01)
G06F 17/22     (2006.01)
G06F 17/24     (2006.01)
G06T 11/60     (2006.01)
```

(52) U.S. Cl.
CPC .......... *G06F 17/289* (2013.01); *G06F 17/2288* (2013.01); *G06F 17/243* (2013.01); *G06T 11/60* (2013.01)

(58) Field of Classification Search
CPC ..... G06F 17/271; G06F 17/28; G06F 17/289; G06F 17/2785; G06F 17/2705; G06F 17/27; G06F 17/2765; G06F 17/2827; G06F 17/2735; G06F 17/274; G06F 17/275; G06F 17/21; G06F 9/4448; G06F 17/2836; G06F 17/277
USPC ........................................ 704/1–10; 358/3.28
See application file for complete search history.

(56) References Cited

U.S. PATENT DOCUMENTS 5,813,018 A * 9/1998 Kaji et al. ....................... 715/236
2005/0050154 A1 * 3/2005 Gossweiler et al. ........... 709/208

FOREIGN PATENT DOCUMENTS

KR    10-2012-0072119 A    7/2012
KR       10-1307790 B1     9/2013

* cited by examiner

*Primary Examiner* — Marivelisse Santiago Cordero
*Assistant Examiner* — Stephen M Brinich (57) ABSTRACT

Provided herein is a sentence hiding and displaying system comprising: an image creating interface receiving an input of information on an original image, a plurality of sentences corresponding to the original image, and a language that needs to be hidden; an image creator configured to determine a sentence that needs to be hidden based on the plurality of sentences and the language that needs to be hidden, and to create on the original image an image where the sentence that needs to be hidden is hidden; a sentence display interface configured to receive an input of information on a language selected by a user; and a sentence extractor and displayer configured to parse a sentence expressed in the selected language of among sentences that need to be hidden based on the hidden image and the selected language, and to display the sentence expressed in the selected language.

14 Claims, 5 Drawing Sheets

SENTENCE HIDING AND DISPLAYING SYSTEM AND METHOD

CROSS-REFERENCE TO RELATED APPLICATIONS

This application claims the benefit of priority under 35 U.S.C. §119(a) of Korean Patent Application No. 10-2014-0048165, filed on Apr. 22, 2014, in the Korean Intellectual Property Office, the entire disclosure of which is incorporated herein by reference for all purposes.

BACKGROUND

1. Field

The following description relates to a sentence hiding and displaying system and method thereof, and more particularly, to a sentence hiding and displaying system whereby a sentence may be hidden in an image and then a certain sentence of among the hidden sentences may be displayed at a user's selection, and a driving method thereof.

2. Field Description of Related Art

There is a rising interest on webtoons as increasing number of portal sites provide webtoons. Furthermore, as the number of people who wish to read famous foreign cartoons through electronic media (computer, ipad and the like) gradually increased, the size of the market for viewing images through electronic media is expected to grow even more. As this market gets bigger, services providing images where sentences of various languages are displayed are drawing much attention. However, in order to provide such a service, sentences consisting of numerous languages have to be translated, and then the translated sentences have to be attached to their original images, which requires creating images as many as the number of the languages, and then these images have to be stored separately. Therefore, a vast storage space is needed.

In addition, in the case of cartoons, a sentence expressed in at least one language is basically provided, but sentences of other languages must be translated by people, which could cause inconvenience.

SUMMARY

Therefore, a purpose of the present disclosure is to provide a sentence hiding and displaying system whereby sentences expressed in a plurality of languages may be hidden in an image, and only the sentences expressed in a language corresponding to a user's request of among the sentences may be displayed on the image, thereby time and storage space needed to manufacture an image providing sentences expressed in various languages can be saved, and a method thereof.

Furthermore, another purpose of the present disclosure is to provide a sentence hiding and displaying system, whereby translation may be performed automatically when necessary and the translated sentence may be hidden in an image, thereby saving time needed to manufacture an image providing sentences expressed in various languages, and a driving method thereof.

For the abovementioned purposes, in general aspect, there is provided a sentence hiding and displaying system comprising: an image creating interface receiving an input of information on an original image, a plurality of sentences corresponding to the original image, and a language that needs to be hidden; an image creator configured to determine a sentence that needs to be hidden based on the plurality of sentences and the language that needs to be hidden, and to create on the original image an image where the sentence that needs to be hidden is hidden; a sentence display interface configured to receive an input of an information on a language selected by a user; and a sentence extractor and displayer configured to parse a sentence expressed in the selected language of among sentences that need to be hidden based on the hidden image and the selected language, and to display the sentence expressed in the selected language on the original image.

In another general aspect, there is provided a sentence hiding and displaying method comprising: receiving an input of information on an original image, a plurality of sentences corresponding to the original image and a language that needs to be hidden; determining a sentence that needs to be hidden based on the plurality of sentences and the language that needs to be hidden; creating on the original image an image where the sentence that needs to be hidden is hidden; receiving an input of a language selected by a user; parsing the sentence expressed in the selected language of among the sentences that need to be hidden; and displaying the sentence expressed in the selected language on the original image.

The present disclosure has an effect of providing a sentence hiding and displaying system whereby sentences expressed in a plurality of languages may be hidden in an image, and only the sentences expressed in a language corresponding to a user's request of among the sentences may be displayed on the image, thereby saving time and storage space needed to manufacture an image providing sentences expressed in various languages and a driving method thereof.

In addition, the present disclosure also has an effect of providing a sentence hiding and displaying system, whereby translation may be performed automatically when necessary and the translated sentence may be hidden in an image, thereby saving time needed to manufacture an image providing sentences expressed in various languages, and a driving method thereof.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Although a few embodiments of the present invention have been shown and described, it would be appreciated by those skilled in the art that changes may be made in this embodiment without departing from the principles and spirit of the invention, the scope of which is defined in the claims and their equivalents.

Figure 1:
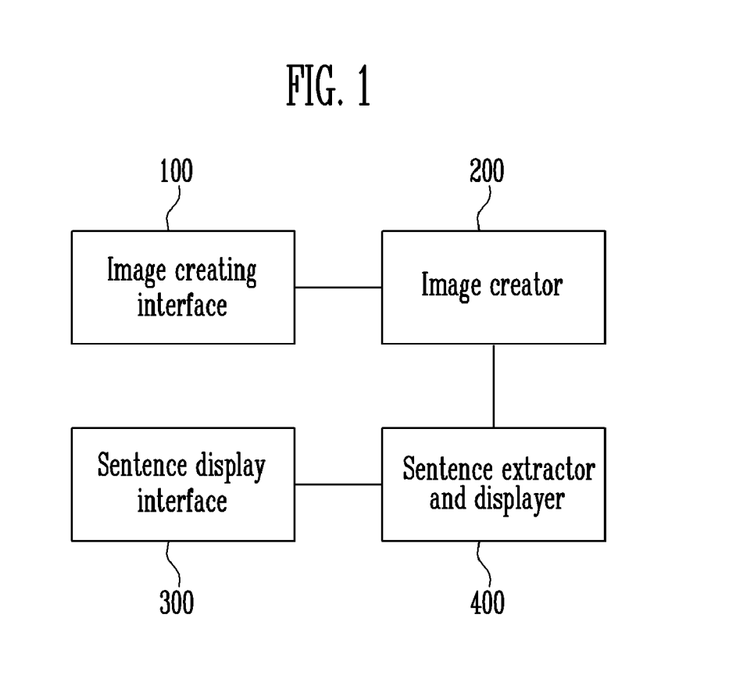
FIG. 1 is a block diagram for explaining a sentence hiding and displaying system according to an exemplary embodiment of the present disclosure.

FIG. 1 is a block diagram for explaining a sentence hiding and displaying system according to an exemplary embodiment of the present disclosure. Referring to FIG. 1, the sentence hiding and displaying system comprises an image creating interface 100, image creator 200, sentence display interface 300, and sentence extractor and displayer 400.

The image creating interface 100 receives an input of an information on an original image, a plurality of sentences corresponding to the original image, a location within the original image where the plurality of sentences are displayed, and a language that needs to be hidden, and then transmits the information to the image creator 200. Based on the received information, the image creator 200 determines a sentence that needs to be hidden, and creates a hidden image based on the original image, location and sentence that needs to be hidden. The hidden image is then transmitted to the sentence extractor and displayer 400. The sentence display interface 300 receives a piece of information on a language selected by a user, and transmits the language selected by the user to the sentence extractor and displayer 400. Based on the hidden image received from the image creator 200 and the selected language received from the sentence display interface 300, the sentence extractor and displayer 400 parses the location and the sentence that need to be hidden expressed in the selected language, and displays the sentence expressed in the selected language on the original image based on the location. Herein, the image creating interface 100 relates to an electronic medium for image manufacturing, and the sentence display interface 300 relates to an electronic medium used for viewing of the user's image. The location within the original image where the plurality of sentences are displayed may be hidden in the hidden image, but may instead be transmitted to the sentence extractor and displayer 400 through an additional process.

Figure 2:
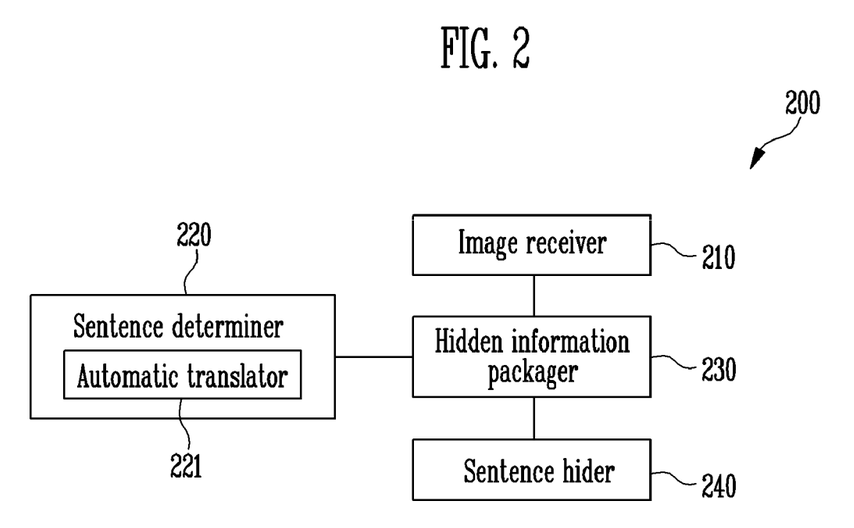
FIG. 2 is a block diagram for explaining an image creator in a sentence hiding and displaying system according to an exemplary embodiment of the present disclosure.

FIG. 2 is a block diagram for explaining an image creator in a sentence hiding and displaying system according to an exemplary embodiment of the present disclosure. The image creator 200 comprises an image receiver 210, sentence determiner 220, hidden information packager 230, and sentence hider 240.

The image receiver 210 receives an input of an original image from the image creating interface 100, and transmits the received original image to the hidden information packager 230. The sentence determiner 220 receives the plurality of sentences and the language that needs to be hidden from the image creating interface 100 and determines the sentence that needs to be hidden. The hidden information packager 230 packages the sentence that needs to be hidden received from the sentence determiner 220 and the location received from the image creating interface 100, and creates a piece of hidden information. The sentence hider 240 hides the hidden information received from the hidden information packager 230 in the original image received from the image receiver 210, and creates a hidden image.

The sentence determiner 220 comprises an automatic translator 221. The sentence determiner 220 compares the language used in the plurality of sentences with the language that needs to be hidden, and determines the language that needs to be hidden but is not included in the languages used in the plurality of sentences as being a language that needs to be translated. In response to there being a language that needs to be translated, the sentence determiner 220 transmits the language that needs to be translated to the image creating interface 100, and may display that additional translation is needed depending on a setting. In the case of a normal cartoon, a sentence corresponding to all locations is provided at least in one language. For example, in webtoons posted on Korean portal websites, Korean is basically provided. Therefore, in response to there being a language that needs to be translated, the automatic translator 221 may translate at least one part of the plurality of sentences (for example, basically provided sentence) into the language that needs to be translated. Herein, the sentence inputed from the image creating interface 100 and the sentence created by translating the sentence in the automatic translator 221 correspond to the same location. In addition, since the automatic translator 221 adds a serial code to the translated sentence, the sentence input in the image creating interface 100 and the sentence translated in the automatic translator 221 may be differentiated based on whether or not there is a serial code.

The hidden information packager 230 packages the sentence that needs to be hidden and the location in a particular format during packaging. The particular format will be explained hereinafter with reference to FIG. 3.

Figure 3:
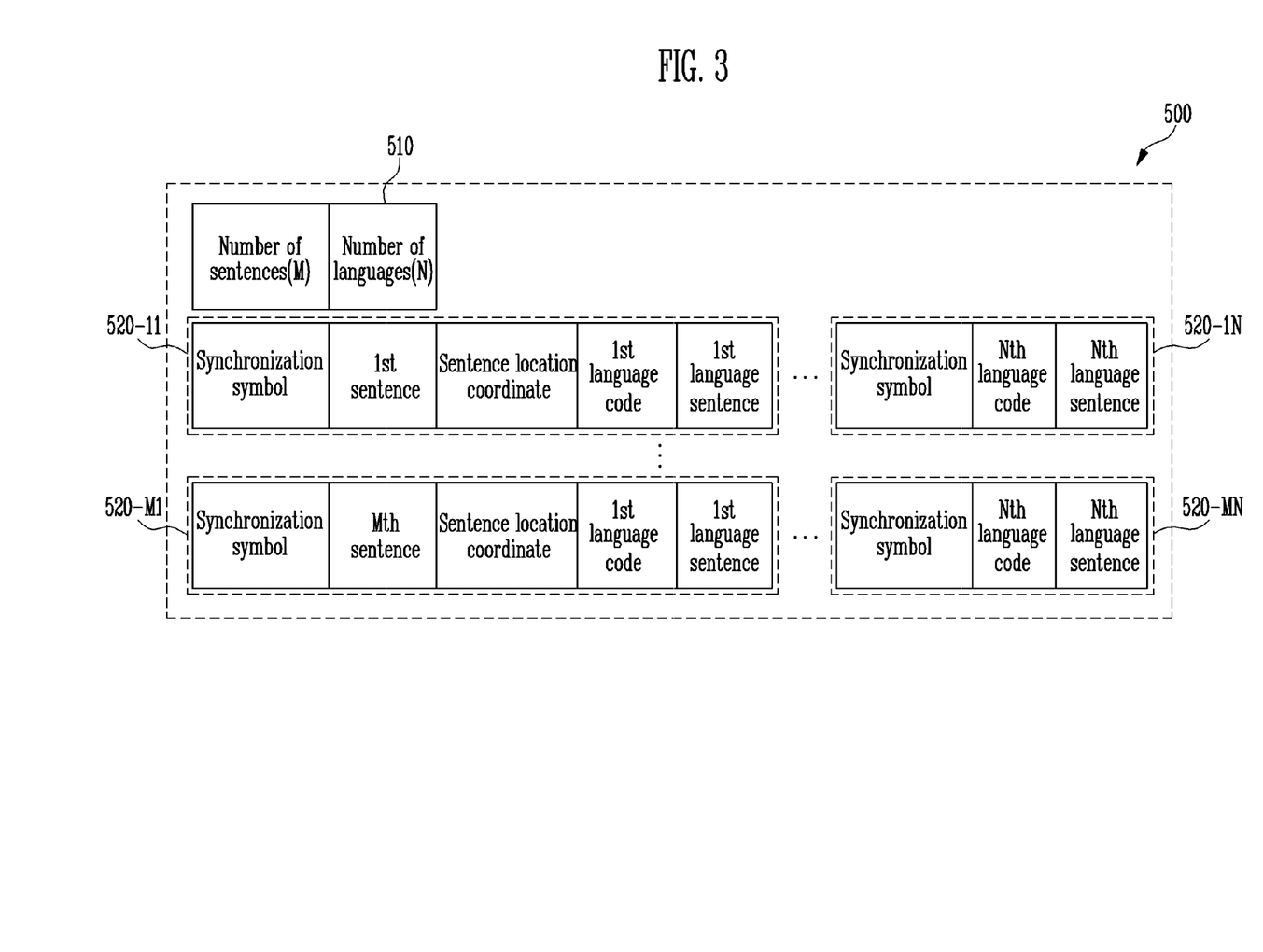
FIG. 3 is a view for explaining a format of a sentence that may be hidden by a sentence hiding and displaying system according to an exemplary embodiment of the present disclosure.

FIG. 3 is a view for explaining a format of a sentence that may be hidden in a sentence hiding and displaying system according to an exemplary embodiment of the present disclosure. Hereinbelow, explanation will be made with reference to FIGS. 1 to 3. The hidden information 500 comprises an entire information storage 510 and individual information storage 520. The entire information storage 510 stores the number of sentences and the number of languages, and in the example illustrated in FIG. 3, the number of the sentences and the number of the languages are shown as M and N, respectively. The individual information storage (520-11 to MN) has an index (11 to MN), and comprises sentences expressed per index ($1^{st}$ language code to $N^{th}$ language code) and a part for storing a synchronization code for differentiating different indexes. In the case of a general cartoon, a sentence corresponding to all locations is basically provided in one language. The individual information storage (520-11, 21 to M1) further comprises a part for storing basically provided sentences ($1^{st}$ sentence to $M^{th}$ sentence) and sentence location coordinates for each sentence. The sentence location coordinate comprises a starting location, ending location and range, and the sentence location coordinate means the location within the original image where the plurality of sentences are displayed. In the example illustrated in FIG. 3, the part storing the basically provided sentences and the sentence location coordinates regarding each sentence is included in the individual information storage (520-11, 21 to M1), but this part may instead be included in the entire information storage 510. In FIG. 3, the sentence location is hidden together with the sentences, but as it was explained above, the sentence location may be transmitted to the sentence extractor and displayer 400 through an additional process.

Figure 4:
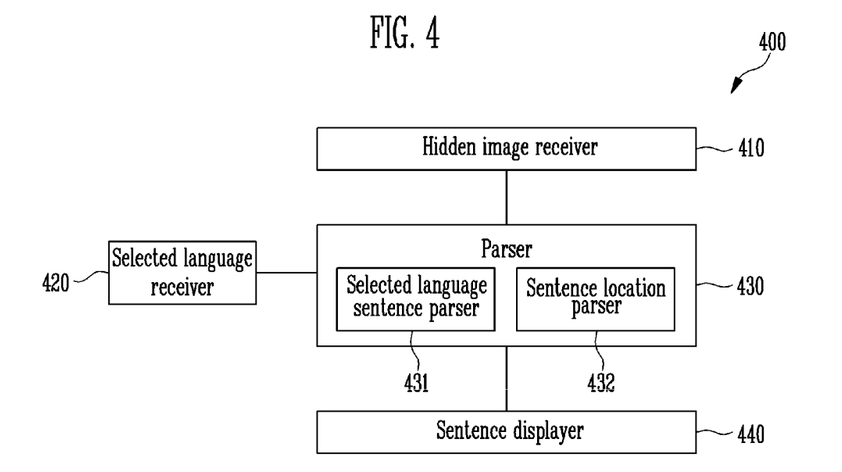
FIG. 4 is a block diagram for explaining a sentence extractor and displayer in a sentence hiding and displaying system according to an exemplary embodiment of the present disclosure.

FIG. 4 is a block diagram for explaining a sentence extractor and displayer in a sentence hiding and displaying system according to an exemplary embodiment of the present disclosure. The sentence extractor and displayer 400 comprises a hidden image receiver 410, selected language receiver 420, parser 430 and sentence displayer 440. The hidden image receiver 410 transmits the hidden image received from the image creator 200 to the parser 430, and the selected language receiver 420 transmits the language selected by the user received from the interface 300 to the parser 430. The parser 430 parses the hidden image, and extracts the original image, location, and sentence. Herein, the parser 430 extracts only the sentences expressed in the selected language of among the sentences that need to be hidden. Sentence displayer 440 displays the sentences expressed in the selected language on the original image based on the location extracted in the parser 430.

The parser 430 comprises a selected language sentence parser 431 and a sentence location parser 432. Referring to FIG. 3, in the case where the language selected by the user corresponds to a $k^{th}$ language code, the selected language sentence parser 431 extracts only the $k^{th}$ language sentence stored in the individual sentence storage (520-1k, 2k to Mk). The sentence location parser 432 extracts only the sentence location coordinate part from the individual information storage (520-11, 21 to M1). Thereafter, the sentence displayer 440 displays on the $1^{st}$ to $M^{th}$ coordinate of the original image extracted by the sentence location parser 432 the $1^{st}$ to Mth sentences expressed in the $K^{th}$ language code extracted by the selected language sentence parser 431. In the case of selecting a language corresponding to the $k^{th}$ language code, the user may view the image on which the $1^{St}$ to $M^{th}$ sentences are displayed.

Figure 5:
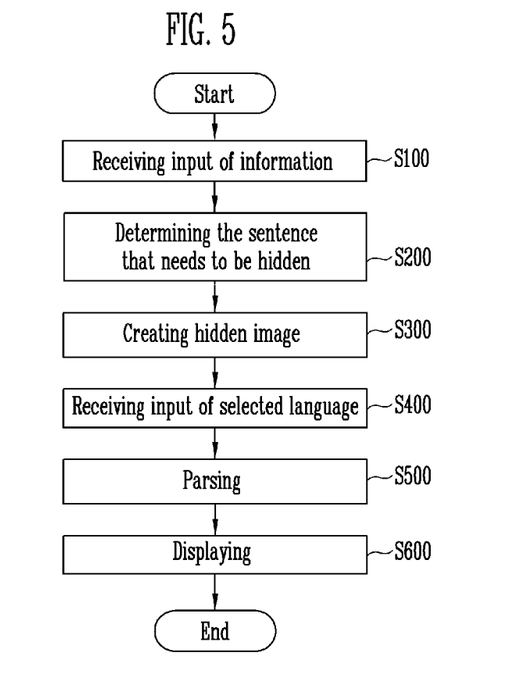
FIG. 5 is a flowchart for explaining a sentence hiding and displaying method according to another exemplary embodiment of the present disclosure.

FIG. 5 is a flowchart for explaining a sentence hiding and displaying method according to another exemplary embodiment of the present disclosure. The sentence hiding and displaying method comprises an operation of receiving an input of information (S100), an operation of determining a sentence that needs to be hidden (S200), an operation of creating a hidden image (S300), an operation of receiving an input of a selected language (S400), an operation of parsing (S500), and an operation of displaying (S600). Hereinbelow, detailed explanation will be made with further reference to FIGS. 1 to 4.

At the operation of receiving an input of information (S100), the image creating interface 100 receives an input of information on an original image, a plurality of sentences corresponding to the original image, a location within the original image where the plurality of sentences are displayed, and a language that needs to be hidden. At the operation of determining the sentence that needs to be hidden (S200), the image creator 200 removes the sentences expressed in languages that need not be hidden from the plurality of sentences, creates by automatic translating the sentences that were not input in the image creating interface 100 but need to be hidden, then determines the sentences that need to be hidden. At the operation of creating a hidden image (S300), the image creator 200 creates hidden information 500 based on the location and sentence that need to be hidden, and hides the hidden information 500 in the original image to create a hidden image. At the operation of receiving an input of a selected language (S400), the sentence display interface 300 receives an input of the language selected by the user, and transmits the selected language to the sentence extractor and displayer 400. At the operation of parsing (S500), the sentence extractor and displayer 400 extracts the location and the sentence expressed in the selected languages of among the sentences that need to be hidden from the hidden image received from the image creator 200. At the operation of displaying (S600), the sentence extractor and displayer 400 transmits the original image, the sentence expressed in the selected language and the location to the sentence display interface 300, and the sentence display interface 300 displays the sentence expressed in the selected language on the location within the original image.

Figure 6:
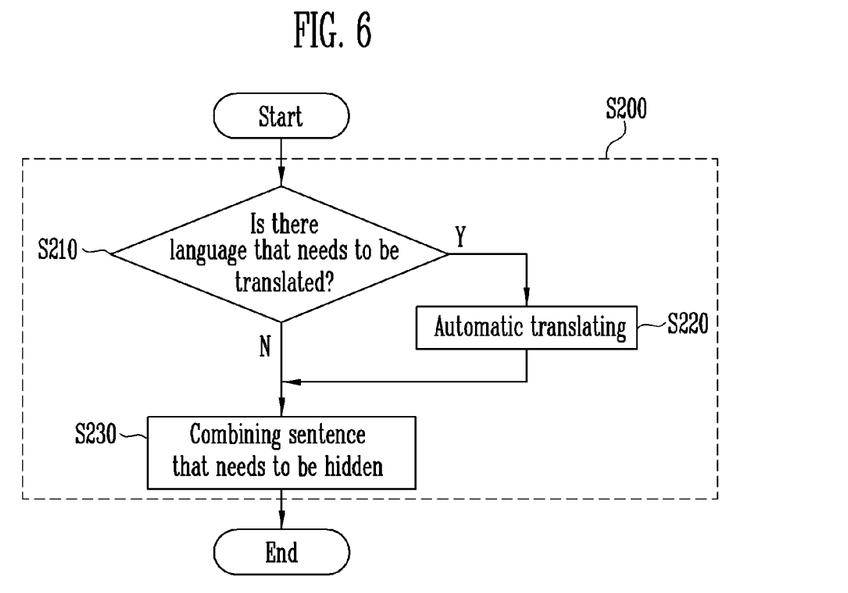
FIG. 6 is a flowchart for explaining an operation of determining a sentence that needs to be hidden in a sentence hiding and displaying method according to another exemplary embodiment of the present disclosure.

FIG. 6 is a flowchart for explaining an operation of determining a sentence that needs to be hidden in a sentence hiding and displaying method according to another exemplary embodiment of the present disclosure. Referring to FIGS. 1 to 6, the operation of determining the sentence that needs to be hidden (S200) comprises an operation of determining whether or not there exists a language that needs to be translated (S210), an operation of automatic translating (S220), and an operation of combining the sentences that need to be hidden (S230).

At the operation of determining whether or not there exists a language that needs to be translated (S210), the sentence determiner 220 compares the language used in the plurality of sentences and the language that needs to be hidden, and determines the language that needs to be hidden but is not included in the language used in the plurality of sentences as the language that needs to be translated. In the case where there exists a language that needs to be translated, an operation of performing automatic translating (S220) is performed, and in the case where there does not exist a language that needs to be translated, an operation of combining the sentences that need to be hidden (S230) is performed since automatic translating is not necessary. In the case where there exists a language that needs to be translated, the image creating interface 100 may display the language that needs to be translated received from the sentence determiner 220, and notify the user that additional translation is necessary.

At the operation of performing automatic translating (S220), the automatic translator 221 performs automatic translating. In the case where there exists a language that needs to be translated, the automatic translator 221 translates at least a portion of the plurality of sentences (for example, the sentences that are basically provided on the image) into the language that needs to be translated. In the translating process, the translated sentences comprise serial codes so as to be differentiated from the plurality of sentences inputed from the image creating interface 100. For example, in the case where only the $N^{th}$ language of among the $1^{st}$ to $N^{th}$ languages is a language that needs to be translated, the automatic translator 221 translates the $1^{st}$ to $M^{th}$ sentence stored in the individual information storage (520-11, 21 to M1) into $N^{th}$ language.

At the operation of combining the sentences that need to be hidden (S230), the sentence determiner 220 combines the plurality of sentences inputed from the image creating interface 100 with the sentences translated in the automatic translator 221 and determines the sentences that need to be hidden. In the case where the operation of automatic translating (S220) has not been performed, it is possible to select only the sentences expressed in the language that needs to be hidden of among the plurality of sentences and determine the sentences that need to be hidden. In the case where the operation of automatic operation (S220) has been performed, it is possible to determine the sentences that need to be hidden with the sentences translated in the language that needs to be translated. For the languages that need not be translated, it is possible to determine the sentences of among the plurality of sentences inputed from the interface 100. For example, in the case where of among the $1^{st}$ to $N^{th}$ languages only the $N^{th}$ language is a language that needs to be translated, the sentence that needs to be hidden is determined by combining the sentences expressed n the $1^{st}$ to $N-1^{th}$ language selected of among the plurality of sentences inputed from the interface 100 with the sentences expressed in the $N^{th}$ language translated in the automatic translator 221.

Figure 7:
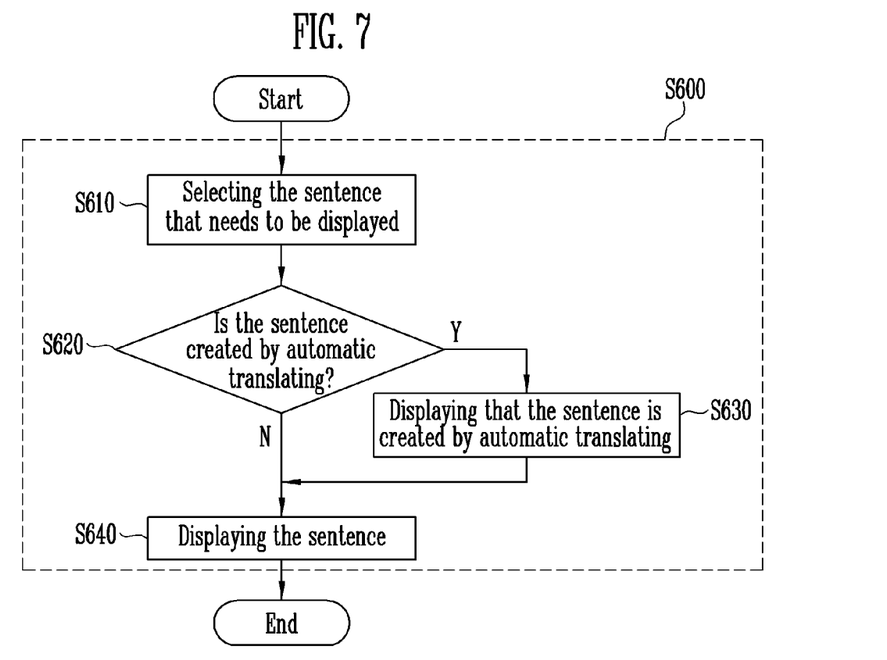
FIG. 7 is a flowchart for explaining an operation of displaying in a sentence hiding and displaying method according to another exemplary embodiment of the present disclosure.

FIG. 7 is a flowchart for explaining an operation of displaying in a sentence hiding and displaying method according to another exemplary embodiment of the present disclosure. The operation of displaying (S600) comprises an operation of selecting a sentence to be displayed (S610), an operation of determining whether or not the sentence is created by automatic translating (S620), an operation of displaying that the sentence is created by automatic translating (S630), and an operation of displaying the sentence (S640). Hereinbelow, detailed explanation will be made with reference to FIGS. 1 to 7.

At the operation of selecting the sentence to be displayed (S610), the sentence displayer 440 selects the sentence to display of among M sentences. In the case where the $k^{th}$ language is selected by the user, the $1^{st}$ to $M^{th}$ sentences expressed in the $k^{th}$ language stored in the individual information storage (520-1k, 2k, 3k, . . . , Mk) are selected.

At the operation of determining whether or not the sentence is created by automatic translating (S620), the sentence displayer 440 determines whether or not the sentence selected in the operation of selecting the sentence to be displayed (S610) is created by automatic translating. Since a serial code is added to the sentence created in the operation of automatic translating (S220), it is possible to determine whether or not the sentence is created by automatic translating based on whether or not there is a serial code. In the case where at least a part of the selected sentence is created by automatic translating, an operation of displaying that the sentence is created by automatic translating (S630) is performed, while in the case where none of the selected sentence is created by automatic translating, an operation of displaying the sentence is performed (S640).

At the operation of displaying that the sentence is created by automatic translating (S630), the sentence displayer 440 may provide the information that the subject sentence is created by automatic translating to the sentence display interface 300 or sentence displayer 440. The sentence display interface 300 may notify the user that since the subject sentence is created by automatic translating, there may be error in the translation.

At the operation of displaying the sentence (S640), the sentence displayer 440 may transmit the contents and location of the sentence stored in the individual information storage (520-1k, 2k, 3k . . . Mk) and original image to the sentence display interface 300, and the sentence display interface 300 may display the sentence expressed in the selected language on a location within the original image. The $1^{st}$ to $M^{th}$ sentences are displayed on each of the corresponding sentences, but no serial code is displayed. The location may be hidden together with the hidden image and be extracted at the operation of parsing (S500), or may be received separately from the image creator 200.

Figure 8:
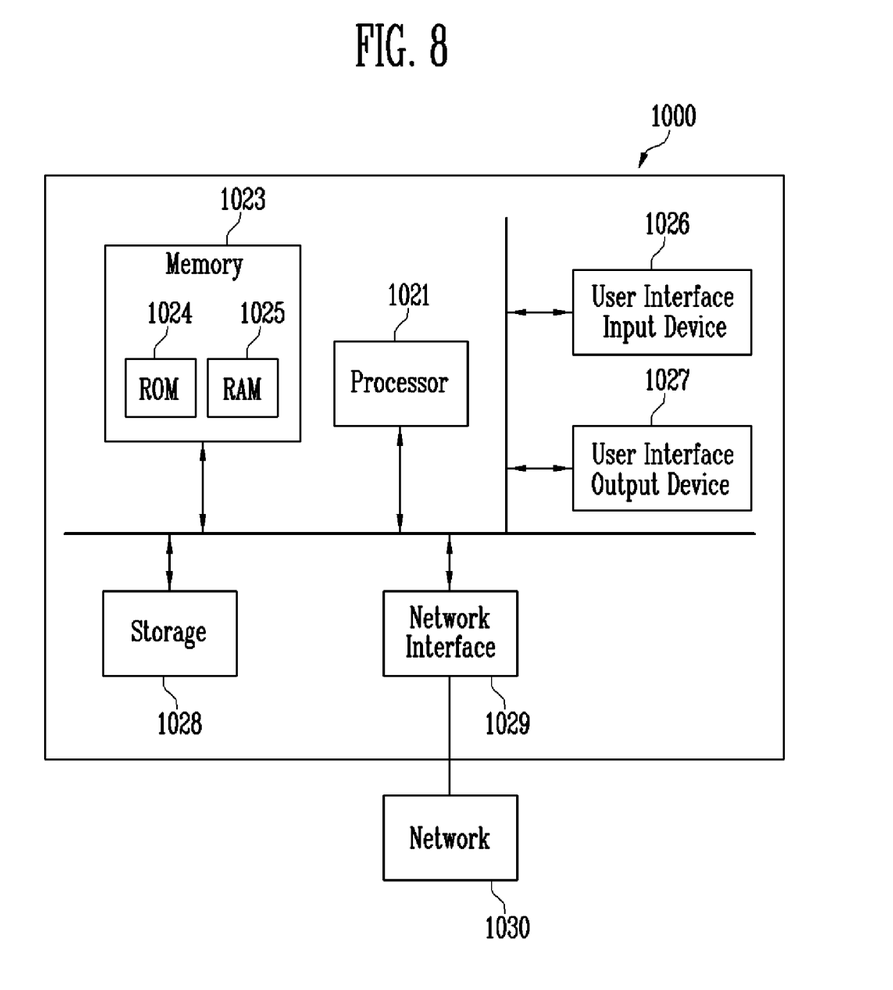
FIG. 8 is a block diagram for explaining a computer system where a sentence hiding and displaying system can be implemented according to an exemplary embodiment of the present disclosure.

FIG. 8 is a block diagram for explaining a computer system where a sentence hiding and displaying system can be implemented according to an exemplary embodiment of the present disclosure. An embodiment of the present invention may be implemented in a computer system, e.g., as a computer readable medium. As shown in FIG. 8, a computer system 1000 may include one or more of a processor 1021, a memory 1023, a user input device 1026, a user output device 1027, and a storage 1028, each of which communicates through a bus 1022. The computer system 1000 may also include a network interface 1029 that is coupled to a network. The processor 1021 may be a central processing unit (CPU) or a semiconductor device that executes processing instructions stored in the memory 1023 and/or the storage 1028. The memory 1023 and the storage 1028 may include various forms of volatile or non-volatile storage media. For example, the memory 1023 may include a read-only memory (ROM) 1024 and a random access memory (RAM) 1025.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A sentence hiding and displaying system comprising:
   an image creating interface receiving an input of information on an original image, a plurality of sentences corresponding to the original image, and information on at least one language to be hidden;
   an image creator configured to determine at least one sentence to be hidden expressed in the language to be hidden from the plurality of sentences, and to create a hidden image of the original image, wherein the at least one sentence is hidden in the hidden image;
   a sentence display interface configured to receive an input of information on a language selected by a user; and
   a sentence extractor and displayer configured to extract at least one sentence expressed in the selected language from the at least one sentences hidden in the hidden image, and to display the at least one sentence expressed in the selected language on the original image.

2. The system according to claim 1,
   wherein the image creating interface further receives an input of information on a location within the original image where the plurality of sentences are displayed, and
   wherein the sentence extractor and displayer displays the at least one sentence expressed in the selected language on the location within the original image.

3. The system according to claim 1,
   wherein the image creator comprises:
   an image receiver configured to receive the original image;
   a sentence determiner configured to receive the plurality of sentences and the information on the at least one language to be hidden, and to determine the at least one sentence to be hidden;
   a hidden information packager configured to create hidden information comprising the at least one sentence to be hidden; and
   a sentence hider configured to hide the hidden information in the original image in order to create the hidden image.

4. The system according to claim 3,
wherein the sentence determiner determines whether or not there exists a language to be translated based on languages used in the plurality of sentences and the at least one language to be hidden,
and comprises an automatic translator configured to translate at least a part of the plurality of sentences into the language to be translated in response to there being the language to be translated.

5. The system according to claim 4,
wherein the automatic translator adds a serial code to the translated sentence when creating the translated sentence, the serial code differentiating the translated sentence from the plurality of sentences.

6. The system according to claim 4,
wherein the sentence determiner transmits the language to be translated to the image creating interface.

7. The system according to claim 1,
wherein the sentence extractor and displayer comprises a hidden image receiver configured to receive the hidden image;
a selected language receiver configured to receive the selected language from the sentence display interface;
a parser configured to extract the at least one sentence expressed in the selected language based on the hidden image and the selected language; and
a sentence displayer configured to display on the original image the at least one sentence expressed in the selected language.

8. The system according to claim 7,
wherein in response to the at least one sentence expressed in the selected language that is created by automatic translating, the parser transmits the fact that the at least one sentence is translated by the automatic translating to the sentence display interface.

9. A sentence hiding and displaying method comprising:
receiving an input of information on an original image, a plurality of sentences corresponding to the original image and information on at least one language to be hidden;
determining at least one sentence to be hidden expressed in the language to be hidden from the plurality of sentences;
creating a hidden image of the original image, wherein the at least one sentence to be hidden is hidden in the hidden image;
receiving an input of information on a language selected by a user;
extracting at least one sentence expressed in the selected language from the at least one sentence hidden in the hidden image; and
displaying the at least one sentence expressed in the selected language on the original image.

10. The method according to claim 9,
wherein the receiving comprises receiving an input of information on a location within the original image where the plurality of sentences are displayed; and
wherein the displaying comprises displaying the at least one sentence expressed in the selected language on the location within the original image.

11. The method according to claim 9,
wherein the determining comprises:
determining whether or not there exists a language to be translated based on languages used in the plurality of sentences and the at least one language to be hidden;
in response to there being the language to be translated, automatically translating at least a part of the plurality of sentences into the language to be translated; and
combining sentences to be hidden based on the plurality of sentences and the sentences created at the operation of performing automatic translating.

12. The method according to claim 11,
wherein the automatically translating comprises creating a translated sentence including a serial code that differentiates the translated sentence from the plurality of sentences.

13. The method according to claim 11,
wherein the determining whether or not there exists a language to be translated comprises displaying the language to be translated to outside.

14. The method according to claim 10,
wherein the displaying comprises displaying that the at least one sentence expressed in the selected language is created by automatic translating.

* * * * *